Aug. 8, 1939.  E. H. HAVIS  2,168,797
METHOD OF AND APPARATUS FOR ROASTING AND BREWING COFFEE
Filed Nov. 13, 1937   5 Sheets-Sheet 1
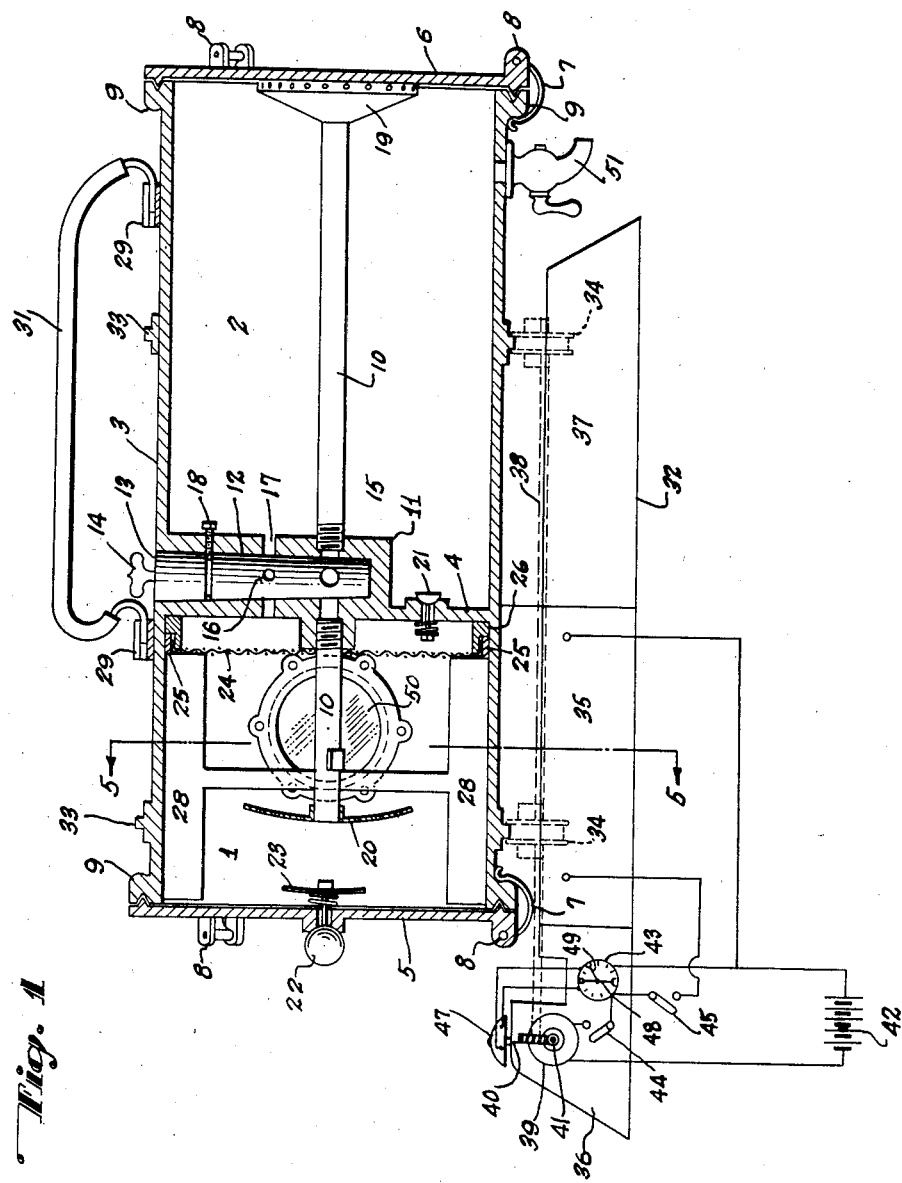
INVENTOR.
Edward Hodge Havis
BY
ATTORNEY.

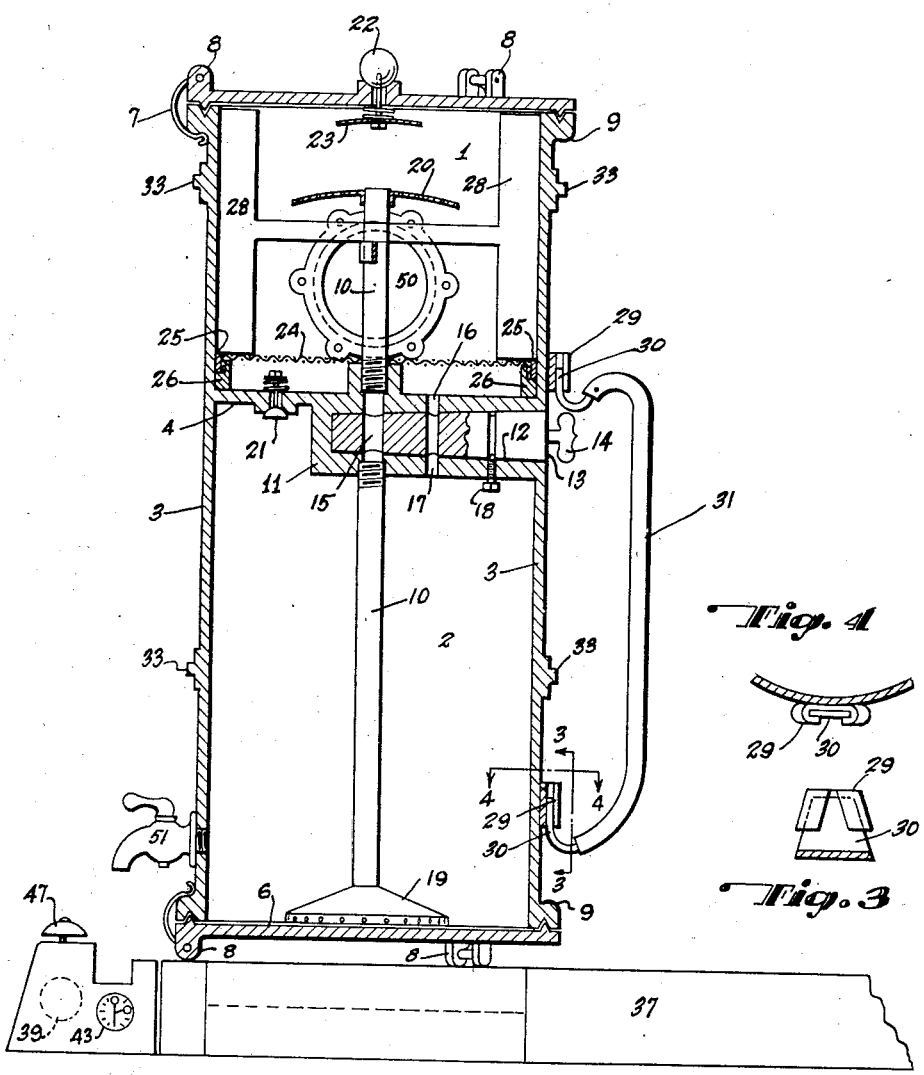

Aug. 8, 1939.   E. H. HAVIS   2,168,797
METHOD OF AND APPARATUS FOR ROASTING AND BREWING COFFEE
Filed Nov. 13, 1937   5 Sheets-Sheet 3

INVENTOR.
Edward Hodge Havis
BY
Cornelius Zabriskie
ATTORNEY.

Aug. 8, 1939.　　　　E. H. HAVIS　　　　2,168,797
METHOD OF AND APPARATUS FOR ROASTING AND BREWING COFFEE
Filed Nov. 13, 1937　　　5 Sheets-Sheet 4

INVENTOR.
Edward Hodge Havis
BY
Cornelius Zalinski
ATTORNEY.

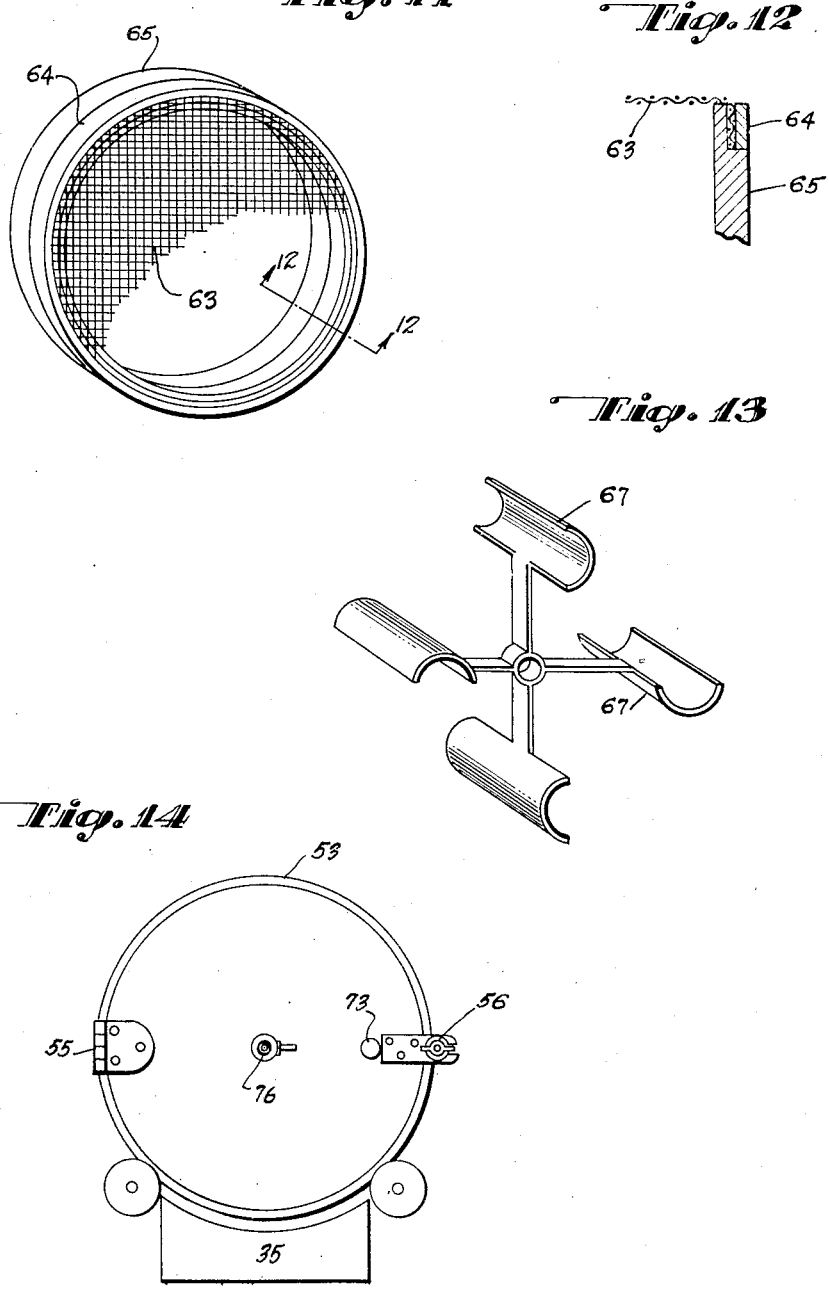

Patented Aug. 8, 1939

2,168,797

UNITED STATES PATENT OFFICE 2,168,797

METHOD OF AND APPARATUS FOR ROASTING AND BREWING COFFEE

Edward Hodge Havis, Atlanta, Ga., assignor of one-third to Sam Everett Finley and one-third to Robert D. Kneale, both of Atlanta, Ga.

Application November 13, 1937, Serial No. 174,403

11 Claims. (Cl. 53—3)

This invention relates to the method of and apparatus for brewing coffee wherein ground green berries are first roasted and thereafter infused within a sealed apparatus. Green coffee berries, ground to the appropriate or desirable degree of fineness, are roasted within a rotary roasting chamber in proximity to a water reservoir attached to one end of the roasting chamber. The water reservoir and the roasting chamber are rigid with respect to one another and rotate together and both are hermetically sealed, although there is provided between them a valved passage through which vapors, generated during the roasting of the coffee, are adapted to pass into the water reservoir. The escape of such vapors to the outer atmosphere is precluded by the air-tight character of the casing in which the reservoir and roasting chamber are incorporated, so that all vapors generated during the roasting operation and which entrain or contain volatilized aromatic or essential oils of the coffee, can only pass to the water reservoir wherein they are absorbed. The rotation of the water reservoir keeps the water in a state of agitation which facilitates the absorption or solution of all vapors entering into proximity therewith.

The method of this invention includes the agitation of the ground green berry particles during the roasting operation and this agitation may be accomplished either through the employment of rotary baffles or vanes within the roasting chamber or the wall of the said roasting chamber may be provided with relatively small ribs or serrations which will result in a tumbling of the coffee particles during rotation of the apparatus, so that individual particles of the coffee are not permitted to remain in such prolonged contact with the wall of the roasting chamber as will cause their overheating or overroasting. In fact the coffee should be kept in a constant state of agitation because of the use of the external heating which is preferably employed.

In the preferred manner of carrying out the present invention, the roasting chamber and the water reservoir are positioned end to end, and after the coffee has been roasted the casing in which both are incorporated is adapted to be moved from the horizontal roasting position into a vertical position, so that the water may be caused to pass through the coffee either in accordance with percolation or drip principles, as may be desired, but in any event a valved passage is provided between the roasting chamber and the water reservoir, so as to preclude the passage of water into the roasting chamber except during the brewing operation.

The method of this invention and the apparatus in which it takes practical form permits the coffee to be subjected to the brewing operation while said coffee remains in a heated state with the cells thereof in open condition, so that a more efficient brewing of the particles can be accomplished. The valved passage referred to is preferably manually controlled, as will be hereinafter more fully described.

In practically carrying out this invention, the timing of the roasting and brewing operations is preferably automatically accomplished with appropriate signalling of the expiration of the predetermined periods during which these operations take place, so that the operator cannot inadvertently forget and permit the coffee to overroast or the precolating operation to be carried on for too long a period.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 shows roasting and percolating apparatus embodying the present invention in coffee roasting condition with certain parts of the apparatus in central section and other parts in side elevation.

Figure 2 is a view similar to Figure 1, but showing the apparatus in brewing condition.

Figure 5:
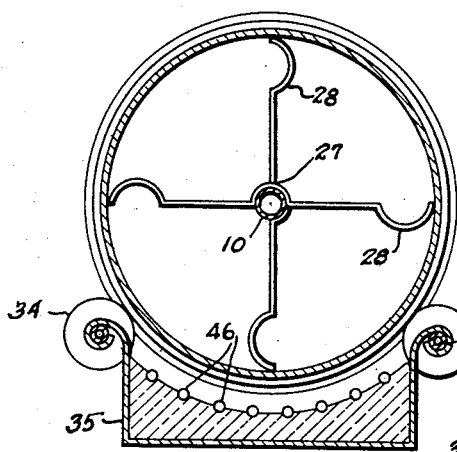
Figure 6:
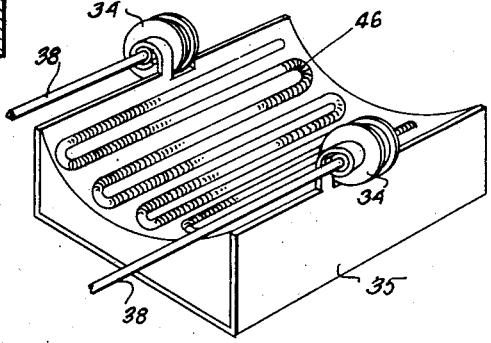
Figure 7:
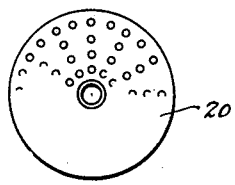
Figure 8:
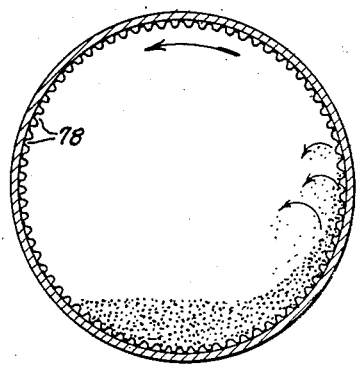
Figure 9:
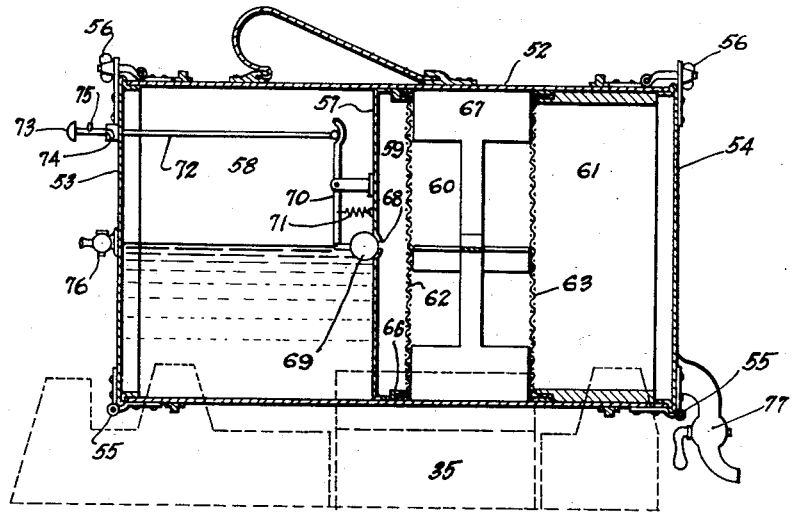
Figure 10:
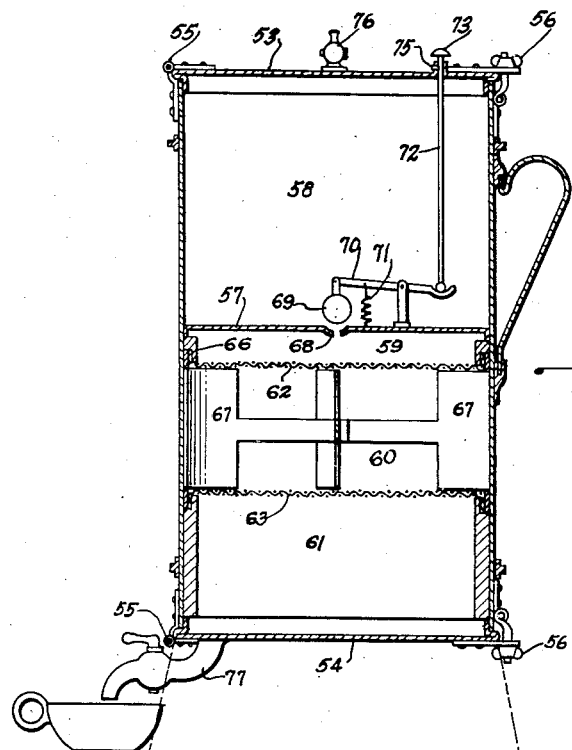

Figure 3 is a section on the line 3—3 of Figure 2.
Figure 4 is a section on the line 4—4 of Figure 2.
Figure 5 is a section on the line 5—5 of Figure 1.
Figure 6 is a fragmental perspective view of the heating unit and associated parts.
Figure 7 is an end view of the upper end of the reservoir pipe of the percolating apparatus showing, in face view, a perforated baffle associated therewith.
Figure 8 is a cross section of a roasting chamber showing a modified form of means for agitating coffee when the roasting chamber is rotated.
Figures 9 and 10 are views similar to Figures 1 and 2, but illustrating the invention in accordance with drip process.
Figure 11 is a perspective view showing a screen element employed in the construction of Figures 9 and 10.

Figure 12 is a section on the line 12—12 of Figure 11.

Figure 13 is a perspective view of agitator blades which may be used in either the drip or percolator constructions.

Figure 14 is an end view of the parts shown in full lines in Figure 9, looking from the left hand side of said figure.

Referring to the drawings and more particularly Figures 1-7, 1 designates a roasting chamber and 2 a water reservoir which in practice may be formed separately and independently of one another and thereafter secured together either permanently or detachably. In the form of the invention shown, however, these two elements of the construction are formed in the opposite ends of a single casing 3 divided internally by a transverse partition 4. The roasting chamber 1 is on one side of said partition, while the water reservoir is at the other side of the partition. The opposite ends of the casing 3 are open, but are provided with closures 5 and 6 by which they may be closed and sealed. These closures may be associated with the casing in any appropriate way so long as they are capable of producing a hermetic seal therewith. As illustrated they engage with the opposite ends of the casing on gaskets, so as to interfit with one another and springs 7 secured in yokes 8 are adapted to be snapped over flanges 9 on the casing to tightly but detachably secure the closures or covers in position in such a way that tight joints will be formed, so as to preclude the leakage of vapors, gases and water.

The structure of Figures 1 and 2 is adapted for the percolation of coffee after it has been roasted and consequently it is provided with a centrally located perforated riser pipe 10 in which is interposed a valve designated generally by the reference character 11. This valve is shown as formed in the partition 4 and as comprising a valve casing having a tapered seat 12 housing a plug 13 provided with an operating handle 14. The plug 13 has ports 15 and 16. The port 15 is adapted when in one position of the plug to line up with the riser pipe and permit the flow of water therethrough, while the port 16 is adapted when in the same position to line up with the straight-through passage 17 in the partition. The plug is held to its seat by a retaining screw 18 operating in an annular groove in the plug. The ports 15 and 16 are so positioned that the plug will either simultaneously seal both the riser pipe and the passage 17 or will simultaneously open both of them.

The riser pipe is provided at one end with the usual perforated percolator foot 19 and has a perforated baffle 20 secured to its upper open end. This baffle is shown in detail in Figure 7.

The partition 4 is provided with a pressure relief valve 21 opening in the direction of the water reservoir 2, while the closure 5 has a similar pressure relief valve 22 opening to the outer atmosphere, but the spring pressure back of the valve 21 is appreciably less than the spring pressure back of the valve 22, so that the valve 22 will only open under dangerous steam pressures. Under all other conditions the valve 21 will solely function, as presently explained. A baffle 23 is associated with the stem of the valve 22 to preclude splashing of water through an opening normally closed by this valve.

Positioned within the roasting chamber 1 adjacent the partition 4 is a screen 24, the peripheral edge of which is clamped by a band 25 to a removable ring 26 and between the screen 24 and the closure 5 is positioned an agitator blade spider 27 carrying agitator blades 28. These blades fit fairly closely within the roasting chamber and engage with the inner peripheral surface thereof to move with and as a part of the casing 3. Said casing is provided at one side with fixed tapered sockets 29 adapted to frictionally engage the wedge shaped opposite ends 30 of a handle 31.

If it be assumed that the plug 13 of the valve is in the closed position shown in Figure 1, the operation of the apparatus as thus far described is as follows.

An appropriate quantity of green coffee berries, ground to the desired degree of fineness, is introduced into the roasting chamber 1 and the closure 5 thereupon tightly fixed in position. The casing 3 is then inverted and water is introduced into the reservoir 2 after which the closure 6 is tightly closed. The coffee is now ready for roasting and the casing 3 is picked up bodily by the handle 31 and caused to rest in horizontal position above a base 32 on which it is adapted to be supported for rotation. This may be conveniently provided for by mounting on the casing 3 a plurality of bearing rings 33 adapted to rest upon rollers 34 on the base. The base may be of any appropriate kind suitable for the purposes hereinafter described. As shown it is provided intermediate its ends with a heating element 35. At one end of the heating element is a closed casing 36 and at the other end a support 37.

The parts 35, 36 and 37 are preferably secured together so as to constitute, in their entirety, the base 32. On this base longitudinal shafts 38 are journalled for rotation and on these shafts are fixed rollers 34, so that the casing 3 rests upon the rollers to be rotatable therewith with minimum friction when one or both of the shafts 38 are driven. The driving mechanism may partake of various forms, but a very satisfactory arrangement is shown diagrammatically in Figure 1. Here one of the shafts 38 is extended to project within the casing 36 and is provided on its outboard end with reducing gearing whereby it is coupled for operation to an electric motor 39. The reducing gearing may conveniently take the form of a worm gear 40 on the shaft 38 meshing with a worm 41 on the armature shaft of the motor. The motor is housed within the casing 36 and is adapted to be energized from any suitable source of current supply indicated at 42.

The circuit which includes the motor, however, includes a time switch 43 and also a manually operable switch 44. The time switch 43 may be of any appropriate and conventional form, of which many are known to the market, and which are adapted, at the expiration of a predetermined interval, to close an electric circuit. Arranged in multiple with the motor circuit is a second circuit including a manually operable switch 45 and also the heating element which, as shown in Figure 6, embodies an electric resistance coil 46. Associated with and under control of the time switch is also a suitable alarm or buzzer 47 which, at the expiration of particular periods, for which the time switch may be set, is adapted to give an alarm. The time switch is shown as having two hands or pointers 48 and 49, the former of which moves as the hand of a clock, while the latter of which may be set to control the closing of the time switch at the expiration of the predetermined period.

If it be assumed that the casing 3 is charged with water and coffee as described, the closing of the switches 44 and 45 with the preliminary setting of the hand 48 to zero and the hand 49 in such angular relation as to predetermine a period of operation, as will be apparent, current will be simultaneously fed to the motor 39 and to the heating element 35. The motor will function, impart the rotation to the shaft 38 and cause the casing 3 to be rotated. Simultaneously, the heating element will function to heat the wall of the roasting chamber 1.

As the operation proceeds, the casing 1 will be rotated, causing the blades 28 to turn therewith and cascade the coffee particles within the coasting chamber, so that they fall in a shower wtihin the chamber and are thus thoroughly agitated and kept in motion. As this operation proceeds, the coffee is roasted with the accompanying driving off of natural moisture therefrom and with the accompanying volatilization of some of the essential or aromatic oils of the coffee entrained in the water vapor resulting from the roasting operation. As the quantity of this vapor increases, it will accumulate within the chamber 1 until its pressure rises slightly, but enough to open the valve 21, whereupon such vapor will be discharged into the water reservoir 2 in which the water is under agitation due to rotation of the casing. This water in agitated condition will readily absorb the vapors which enter the chamber 2 and none of these vapors can escape for the entire casing is sealed. Consequently none of the vapors are lost as is evident from the fact that no coffee odor is present in the vicinity of the apparatus during the roasting operation. If the attendant desires to inspect the coffee, while it is roasted, this may be accomplished by looking through the window 50 provided in the side of the roasting chamber and it is not necessary or desirable to open the casing for inspection purposes at any time.

The roasting having proceeded to completion, the time clock will automatically function to shut off the motor 39 and de-energize the heating element 35 with accompanying ringing of the bell 47 to advise the attendant that the roasting operation is completed. The attendant thereupon applies the handle 31, which was removed during the roasting operation, and through the agency of this handle lifts the casing 1 into upright position and places it upon the base in such manner that it will be superimposed upon or over the heater 35. The structure may be such, if desired, that the casing will rest directly upon the heater 35 or on legs provided on the closure 6 and adapted to straddle the heater or upon a suitable platform adapted to be rested upon the heater or having legs to straddle the heater. The manner of supporting the casing in upright position, as stated, may widely vary, but it is shown in Figure 2 as resting directly on the heater for illustrative purposes. The casing having been set in vertical position as stated, the valve plug 13 is turned into the position of Figure 2. The switch 44 is now opened, the hand 48 of the time switch is set back to zero and the hand 49 moved to correspond with an elapsed period necessary to percolate the coffee. The current is thus caused to be immediately fed to the heater and the heat therefrom impinges the bottom 6 of the casing.

The water in the reservoir has of course been heated to some extent during the roasting operation, so that it will very shortly generate sufficient vapor to effect a percolating operation in which water will be forced upwardly through the riser pipe 10, impinge the baffle 23 and fall on the perforated baffle 20 to be distributed thereby throughout the transverse area of the chamber 1.

The roasted coffee will at this time rest upon the screen 24 so that the water will seep through such coffee and return to the reservoir 2 through the passage 17.

After the coffee is percolated for the period controlled by the time clock, the feed of electric current to the heater 35 will be shut off and the bell 47 will ring to advise the attendant that the coffee is percolated, finished and ready for use. It may be drawn off through a manually operable cock 51 positioned close to the bottom of the reservoir 2.

The purpose of the presssure relief valve 22 is to preclude the building up of excessive pressures during the percolating operation and is merely a safety factor. It only opens during the percolating of the coffee and then momentarily, so that there is no appreciable loss of vapors even during the brewing stage.

In Figures 1–7, the invention has been shown as incorporated in apparatus utilizing percolating principles.

In Figures 9 and 10, the adaptation of the invention to drip pot principles is disclosed. As shown in these latter figures, the casing is shown as 52, is provided at one end with a closure 53 and at its other end with a closure 54. These closures are respectively hinged to the casing 52 by hinges 55 and are adapted to be tightly secured against gaskets to the open ends of the casing by hinged thumb screws 56, so as to hermetically seal the casing. Intermediate the ends, the casing is provided with a transverse partition 57, at one side of which is a water reservoir 58. The space at the other side of the partition is divided into three chambers 59, 60 and 61 by two screen partitions 62 and 63. The screen partition 63 is clamped at its periphery by a clamp 64 to a ring 65 of appreciable height, so that the chamber 61 will be large enough to contain or receive water normally contained in the reservoir 58. The screen partition 62 is similarly mounted in a relatively shallow ring 66. The chamber 60 constitutes the roasting chamber and is provided therein with a blade spider having blades 67, see Figure 13.

The partition 57 has a centrally disposed valve seat 68 and with this seat is associated a valve 69, the stem of which is secured to the lever 70 normally held by a spring 71 in position to seat the valve. The opposite end of the lever is under control by a manually operable push rod 72, which extends with a tight fit through a boss of the closure 53 and has a finger piece 73 on its outer end. The boss has a bayonet slot 74 and when the rod 72 is pressed inwardly to unseat the valve 69 against the tension of the spring 71, a pin 75 on said rod may be engaged with the bayonet slot 74 to hold the valve in unseated position. The closure 53 has a relief valve 76, while the other closure 54 has a draw off cock 77.

The drip pot apparatus is adapted to rest on the same sort of a base as in the preceding figures, but is so proportioned that the whole of the roasting chamber will overlie the heater, while a sufficient portion of the water reservoir 58 will overlie the heater to insure heating of the water to near its boiling point while roasting of the coffee is being accomplished within the roasting chamber 60.

Water is introduced into the reservoir 58 by opening the closure 53 and coffee is introduced into the roasting chamber by opening the closure 54 and removing the screen partition 63 and its associated carrying ring 65.

The roasting of the coffee and the heating of the water will be apparent from Figure 9 and at the conclusion of which the casing 52 is set upright as shown in Figure 10 on the base or any other suitable support, and the valve 69 unseated to permit the water to fall upon the screen partition 62 and seep through the roasted coffee resting on the screen 63. The brewed coffee is received into the chamber 61 from which it is dispensed through the cock 77.

In both forms of the invention which I have described the coffee is kept in motion in the roasting chamber by blades. In lieu of blades I may, however, longitudinally serrate or rib the roasting chamber as shown at 78 in Figure 8, but these ribs should be very small, not appreciably larger than the particles of coffee, so that the rotation of the casing will cause a constant tumbling or movement between the particles of coffee during roasting whereby no particle is retained at rest for any appreciable time in any one position. Figure 8 shows the ribs larger than they should be for best results and if the ribs are made very fine or only sufficiently large to cause constant movement of the coffee the best results are obtained. A very finely ribbed or striated surface will effect this result, whereas a smooth surface will simply permit the particles to slide thereover without actually changing the relation of the coffee to the heated surface.

It will be noted that the different forms of apparatus which I have described are well adapted to carry out the method of this invention which is characterized by the fact that all fumes, oils and other volatile matter evolved from the coffee during the roasting thereof are sealed within a closed space from which they can only escape into contact with the water which is to be subsequently used in the brewing of coffee. They cannot escape to the atmosphere but are brought directly in contact with the water. If there be some non-condensible gases evolved even they will be almost completely entrained in the water for in both the percolator or drip apparatus water falls through these gases in a shower and this shower will entrain, dissolve or condense practically all of the gases.

It is also advantageous that the coffee is subjected to the brewing stage, while the roasted coffee retains a considerable part of the heat of roasting. In other words, the brewing operation takes place before the coffee is cooled off and while the coffee particles are very hot and consequently the infusion takes place while the cellular structure of the coffee particles is expanded and opened and is subject to rapid solubility of its oils and mineral constituents which are carried away by the water of the beverage. This fact insures a better body, taste and aroma than can be obtained if the particles are allowed to cool and contract prior to infusion.

The invention thus not only takes advantage of the heated character of the coffee, but also provides that all vapors resulting from the roasting operation shall be saved and condensed or entrained in the water of the beverage, so that none are lost to the atmosphere.

In the foregoing detailed description I have set forth different practical embodiments of apparatus embodying the present invention and susceptible of carrying out the method thereof, but it will be understood that the apparatus may be modified in the interests of economy of manufacture, without departing from the invention, the scope of which is fully commensurate with the appended claims.

Having thus fully described the invention, what I claim as new and desire to secure by Letters Patent is:

1. An apparatus of the character described, comprising a casing having therein a normally sealed roasting chamber and a normally sealed water reservoir positioned end to end with an interposed pressure relief valve adapted to pass vapors from the roasting chamber into the water reservoir during the roasting of coffee in said chamber, and manually operable means to permit passage of water from the reservoir into the chamber during the subsequent infusion period.

2. An apparatus of the character described, comprising a casing having therein a normally sealed roasting chamber and a normally sealed water reservoir positioned end to end with an interposed pressure relief valve adapted to pass vapors from the roasting chamber into the water reservoir during the roasting of coffee in said chamber, manually operable means to permit passage of water from the reservoir into the chamber during the subsequent infusion period, means for supporting said casing and for rotating it on a substantially horizontal axis during the roasting period, and means for applying heat to the roasting chamber during the roasting period.

3. An apparatus of the character described, comprising a casing having therein a normally sealed roasting chamber and a normally sealed water reservoir positioned end to end with an interposed pressure relief valve adapted to pass vapors form the roasting chamber into the water reservoir during the roasting of coffee in said chamber, manually operable means to permit passage of water from the reservoir into the chamber during the subsequent infusion period, means for supporting said casing and for rotating it on a substantially horizontal axis during the roasting period, and means for applying heat to the roasting chamber during the roasting period and to the water reservoir during the infusion period.

4. An apparatus of the character described, comprising a sealed elongated casing provided intermediate its ends with an internal partition forming within the casing roasting and water chambers and provided with valvular means to permit vapors to pass from the roasting chamber to the water chamber during roasting periods and water to pass freely between said chambers in either direction during infusion periods.

5. An apparatus of the character described, comprising a sealed elongated casing provided intermediate its ends with an internal partition forming within the casing roasting and water chambers and provided with valvular means to permit vapors to pass from the roasting chamber to the water chamber during roasting periods and water to pass freely between said chambers in either direction during infusion periods, in combination with a supporting base having means to support the casing for rotation on a substantially horizontal axis during roasting periods, means for rotating the casing while thus supported, and a heater carried by the base and positioned beneath the roasting chamber to heat the latter and roast coffee contained therein.

6. An apparatus of the character described, comprising a sealed elongated casing provided intermediate its ends with an internal partition forming within the casing roasting and water chambers and provided with valvular means to permit vapors to pass from the roasting chamber to the water chamber during roasting periods and water to pass freely between said chambers in either direction during infusion periods, in combination with a supporting base having means to support the casing for rotation on a substantially horizontal axis during roasting periods, means for rotating the casing while thus supported, a heater carried by the base and positioned beneath the roasting chamber to heat the latter and roast coffee contained therein, and means for timing the rotation of the casing and roasting of the coffee.

7. An apparatus of the character described, comprising a sealed elongated casing having an internal partition forming therein roasting and water chambers, a pressure relief valve in the partition to pass vapors from the roasting chamber to the water chamber, a percolator riser pipe extending through the partition, said partition having a water return passage therethrough, and a manually operable valve for simultaneously opening or closing both the riser pipe and said passage.

8. A drip pot comprising a sealed casing provided therein with a solid partition having a valve therein and on one side of which partition the interior of the casing constitutes a water reservoir, the space on the other side of the casing being divided by a foraminous partition into a roasting chamber and a water receiving chamber, said valve being normally closed to exclude the passage of water into the roasting chamber, and means for opening said valve to permit of infusion of roasted coffee contained in the roasting chamber.

9. A drip pot comprising a sealed casing provided therein with a solid partition having a valve therein and on one side of which partition the interior of the casing constitutes a water reservoir, the space on the other side of the casing being divided by a foraminous partition into a roasting chamber and a water receiving chamber, said valve being normally closed to exclude the passage of water into the roasting chambers, in combination with means for supporting the casing for rotation to tumble ground unroasted coffee contained in the roasting chamber, a stationary heater for heating the casing, while it is rotated, to roast the coffee and heat water in the reservoir, said valve being thereafter operable to permit of infusion of the roasted coffee.

10. The herein described method which comprises roasting previously ground green coffee berries in a sealed enclosure free from contact with but in operative gaseous communication with an enclosed body of water adapted to absorb the vapors given off by the coffee during the roasting thereof, mechanically agitating both the ground coffee berries and the water during the roasting of said ground berries and promptly thereafter passing such water through the hot roasted coffee to produce a beverage infusion thereof.

11. The herein described method which comprises roasting previously ground green coffee berries in a sealed enclosure free from contact with but in operative gaseous communication with an enclosed body of water adapted to absorb the vapors given off by the coffee during the roasting thereof, mechanically agitating the coffee while roasting the same, and promptly thereafter passing such water through the hot roasted coffee to produce a beverage infusion thereof.

EDWARD HODGE HAVIS.